(12) United States Patent
Yabukami et al.

(10) Patent No.: US 12,474,299 B2
(45) Date of Patent: Nov. 18, 2025

(54) MEASUREMENT DEVICE AND MEASUREMENT METHOD FOR MEASURING PERMEABILITY AND PERMITTIVITY

(71) Applicant: TOHOKU UNIVERSITY, Sendai (JP)

(72) Inventors: Shin Yabukami, Sendai (JP); Kazuhiko Okita, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 91 days.

(21) Appl. No.: 18/058,527

(22) Filed: Nov. 23, 2022

(65) Prior Publication Data
US 2023/0094478 A1    Mar. 30, 2023

Related U.S. Application Data

(63) Continuation of application No. PCT/JP2021/036863, filed on Oct. 5, 2021.

(30) Foreign Application Priority Data

Oct. 23, 2020   (JP) .............................. JP2020-178186

(51) Int. Cl.
    *G01N 27/72*    (2006.01)
    *G01R 33/12*    (2006.01)

(52) U.S. Cl.
    CPC .......... *G01N 27/72* (2013.01); *G01R 33/1223* (2013.01)

(58) Field of Classification Search
    CPC ...... G01N 22/00; G01N 27/221; G01N 27/72; G01R 27/2623; G01R 27/2664;
    (Continued)

(56) References Cited

U.S. PATENT DOCUMENTS

| 2010/0127707 A1* | 5/2010 | Lee ................... G01R 33/34084 324/318 |
| 2011/0057653 A1 | 3/2011 | Barmatz et al. |
| 2012/0098554 A1* | 4/2012 | Fourneaud ............ G01N 22/00 324/693 |

FOREIGN PATENT DOCUMENTS

| JP | 1082845 A | 3/1998 |
| JP | 200814920 A | 1/2008 |

(Continued)

OTHER PUBLICATIONS

Calcagno et al., "Semiautomatic permeance tester for thick magnetic films", Rev. Sci. Instrum., 1975, pp. 904-908, vol. 46, No. 7.

(Continued)

*Primary Examiner* — Judy Nguyen
*Assistant Examiner* — Brent J Andrews
(74) *Attorney, Agent, or Firm* — The Webb Law Firm

(57) ABSTRACT

The measurement device for measuring permeability and permittivity of an object, includes a probe in which a signal transmission line is formed and on which the object is capable of being disposed close to or in contact with the signal transmission line; a magnetic-field application unit configured to apply a magnetic-field to the object; a signal measurement instrument configured to measure a signal transmitted through the signal transmission line in each state in which the object is disposed and not disposed on the signal transmission line and in each state in which the magnetic-field is applied and not applied; a permeability processing unit configured to obtain the permeability of the object; and a permittivity processing unit configured to obtain the permittivity of the object, the both units obtaining based on the signal transmitted through the signal transmission line in each state in which the magnetic-field is applied and not applied.

7 Claims, 16 Drawing Sheets

(58) Field of Classification Search
CPC ........ G01R 33/1223; G01R 1/00; G01R 3/00;
G01R 5/00; G01R 7/00; G01R 9/00;
G01R 11/00; G01R 13/00; G01R 15/00;
G01R 17/00; G01R 19/00; G01R 21/00;
G01R 22/00; G01R 23/00; G01R 25/00;
G01R 27/00; G01R 29/00; G01R 31/00;
G01R 33/00; G01R 35/00
See application file for complete search history.

(56) References Cited

FOREIGN PATENT DOCUMENTS

| | | | |
|---|---|---|---|
| JP | 201060367 | A | 3/2010 |
| JP | 2010060367 | A * | 3/2010 |
| JP | 201158852 | A | 3/2011 |
| JP | 201232165 | A | 2/2012 |
| JP | 2014190717 | A | 10/2014 |
| JP | 2015172497 | A | 10/2015 |
| JP | 201653569 | A | 4/2016 |
| JP | 2017111052 | A | 6/2017 |
| JP | 2018205076 | A | 12/2018 |
| JP | 2020159886 | A | 10/2020 |
| WO | 2006090550 | A1 | 8/2006 |
| WO | 2011012767 | A1 | 2/2011 |

OTHER PUBLICATIONS

Webb et al., "High-frequency permeability of laminated and unlaminated, narrow thin-film magnetic stripes", J. Appl. Phys., 1991, pp. 5611-5615, vol. 69, No. 8.
Weir, W.B., "Automatic Measurement of Complex Dielectric Constant and Permeability at Microwave Frequencies", Proc IEEE, 1974, pp. 33-36, vol. 62, No. 1.
Yabukami et al., "High Sensitivity Permeability Measurements of Striped Films Obtained by Input Impedance", IEEE Trans. Magn., 2001, pp. 2776-2778, vol. 37, No. 4.
Yamaguchi et al., "A New 1MHz-2GHz Permeance Meter For Metallic Thin Films", IEEE Trans. Magn., 1997, pp. 3619-3621, vol. 33, No. 5.
International Search Report mailed Dec. 28, 2021 for International Patent Application No. PCT/JP2021/036863.
Extended European Search Report dated Oct. 10, 2023 issued in European Patent Application No. 21882582.6.
Lepetit et al., "Accurate Characterization of Both Thin and Thick Magnetic Films Using a Shorted Microstrip", IEEE Transactions on Magnetics, 2014, pp. 1-10, vol. 50, No. 9.
Lu et al., "A ceramic-based microwave sensor for both permittivity and permeability characterization of materials", Journal of Physics D: Applied Physics, 2020, pp. 1-9, vol. 53, No. 34.
Queffelec et al., "A Microstrip Device for the Broad Band Simultaneous Measurement of Complex Permeability and Permittivity", IEEE Transactions on Magnetics, 1994, pp. 224-231, vol. 30, No. 2.

* cited by examiner

[FIG. 1]
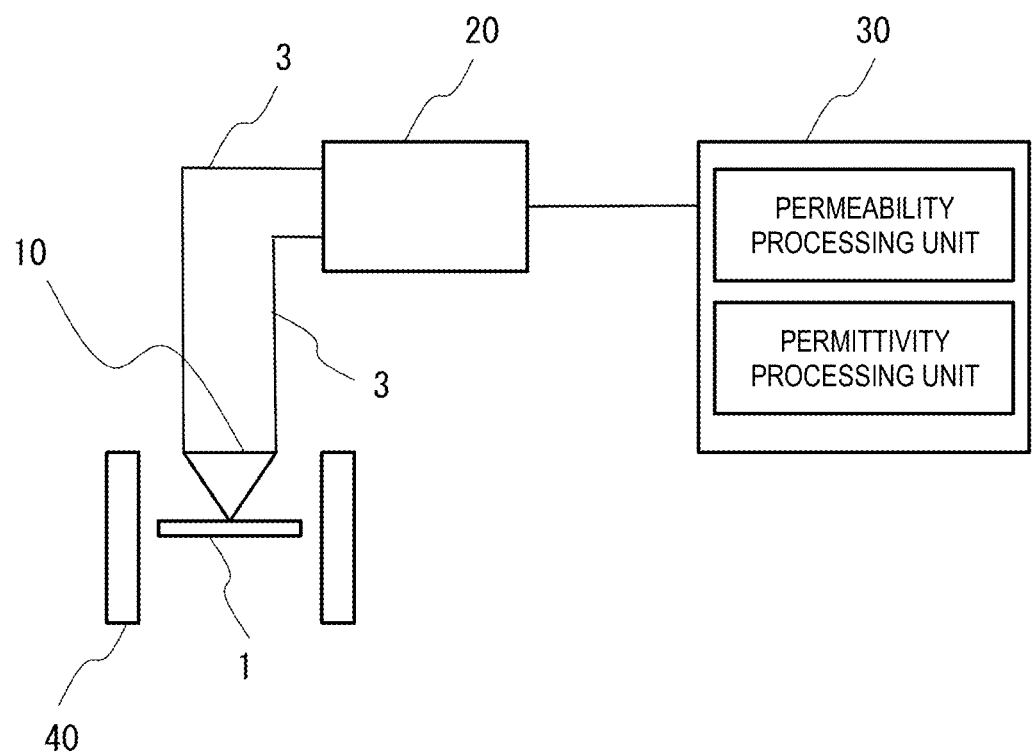

[FIG. 2(a)]
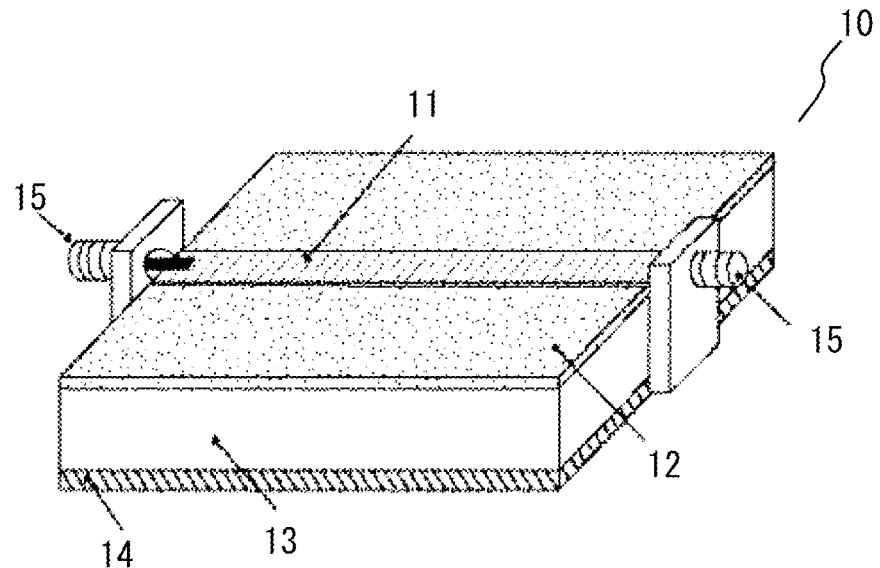
[FIG. 2(b)]
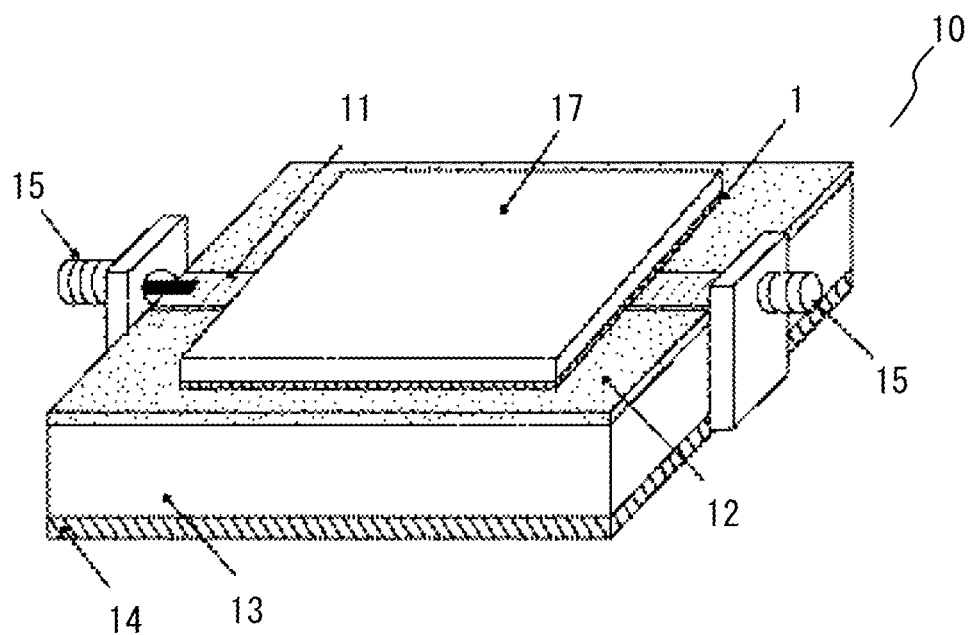

[FIG. 3(a)]
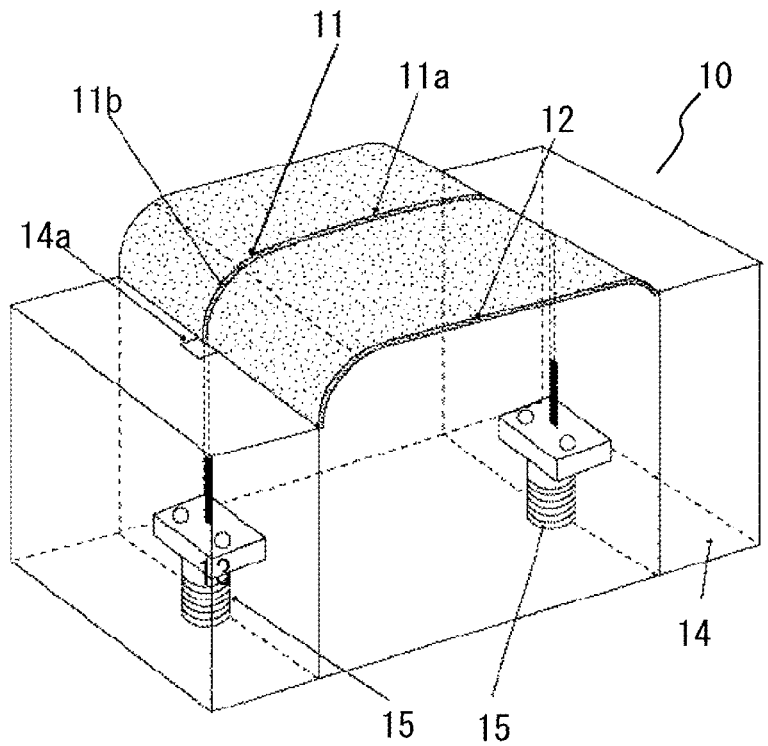
[FIG. 3(b)]
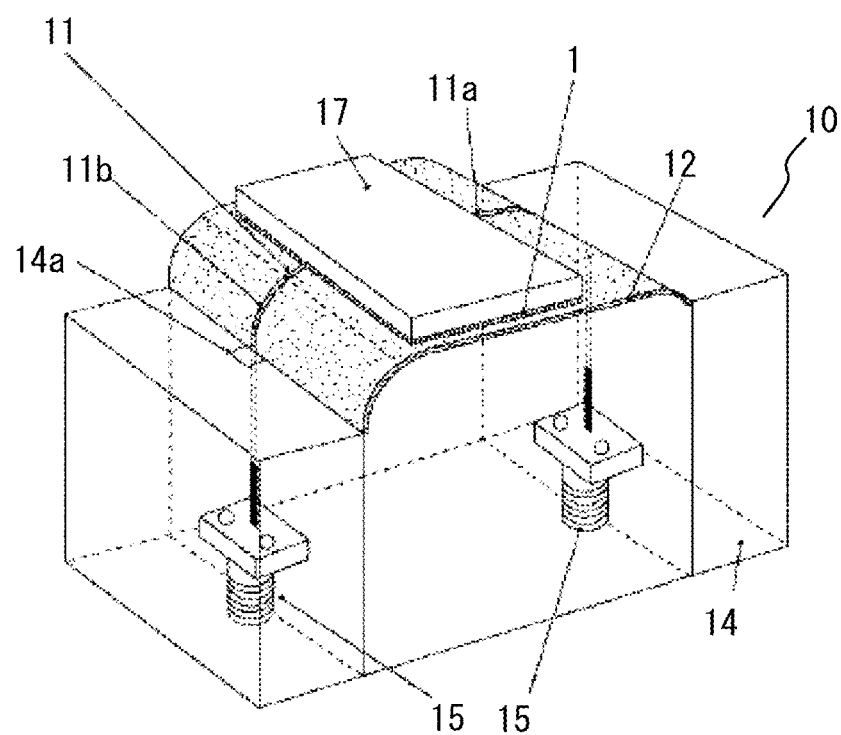

[FIG. 4]
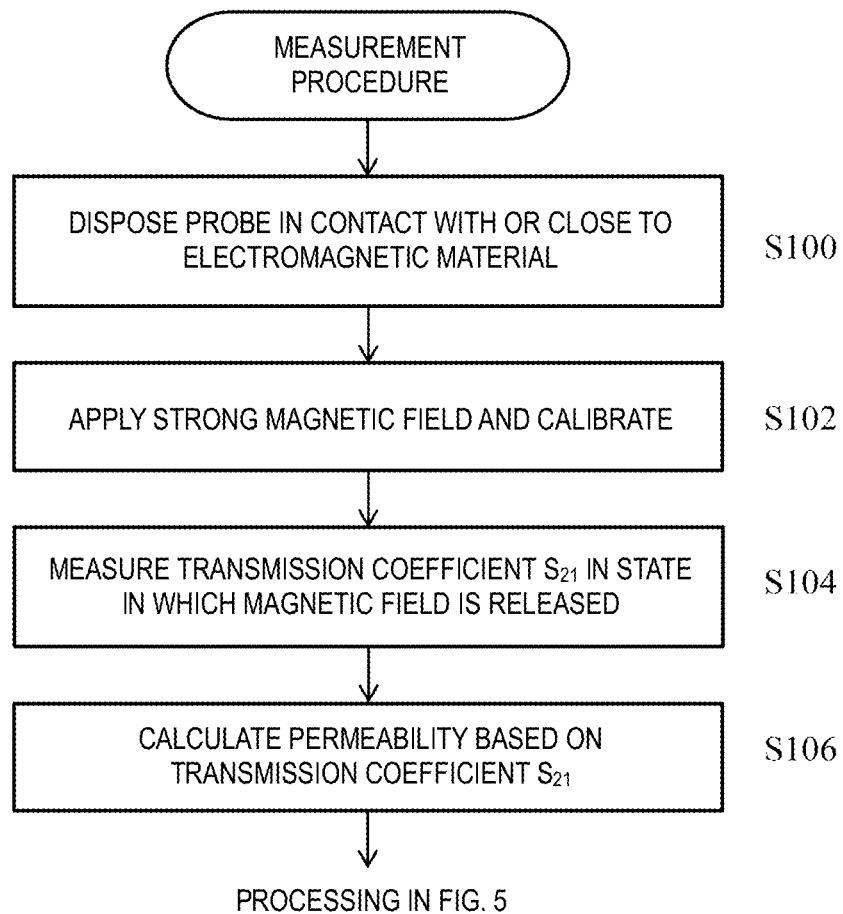

[FIG. 5]
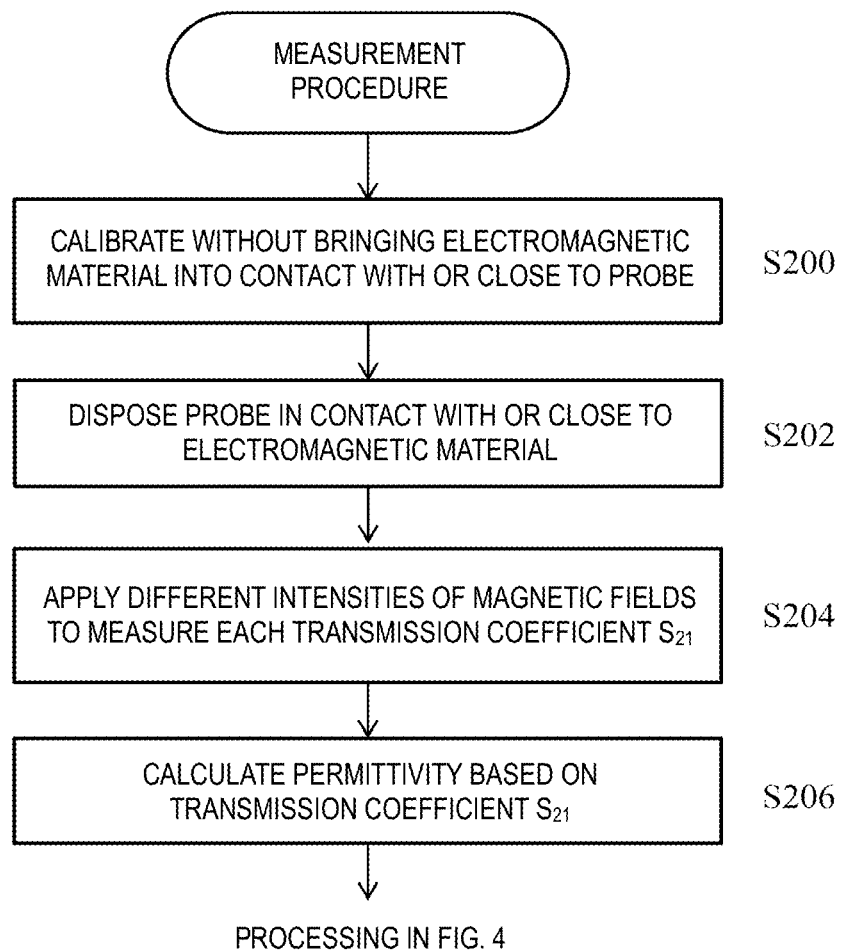

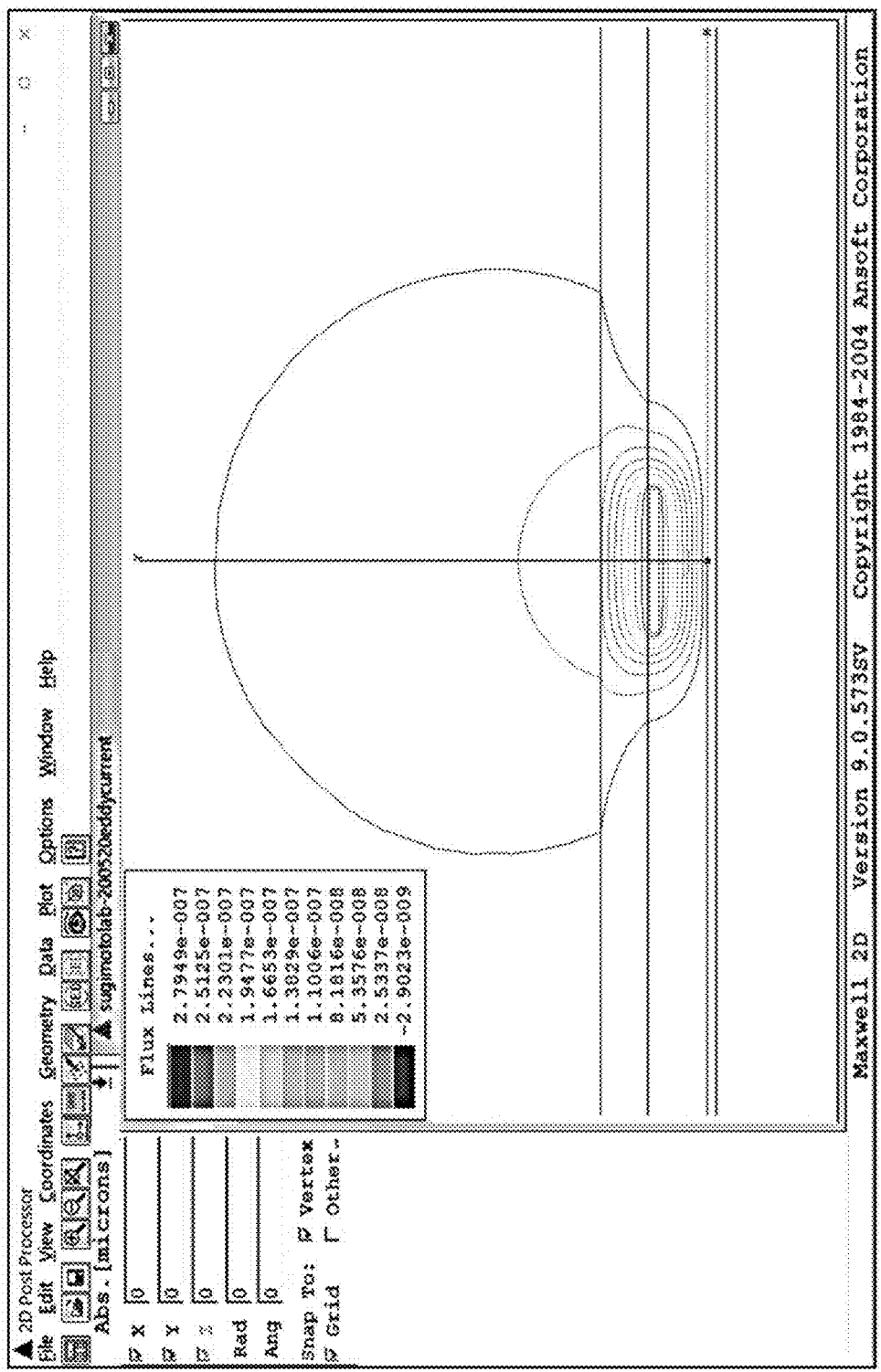
[FIG. 6(a)]

[FIG. 6(b)]
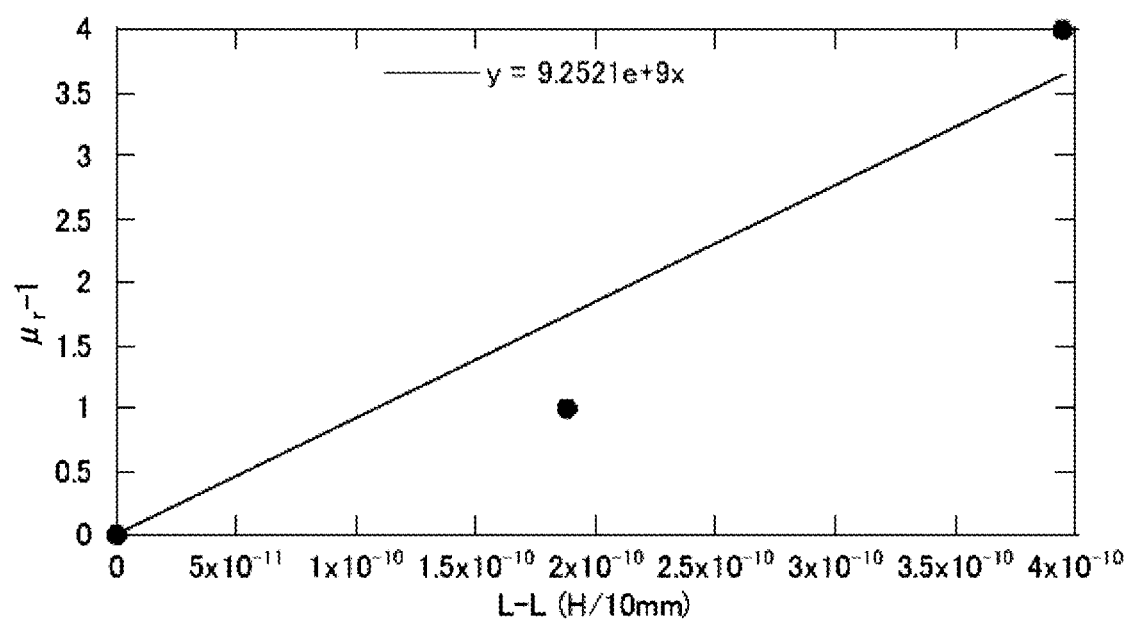

[FIG. 7]
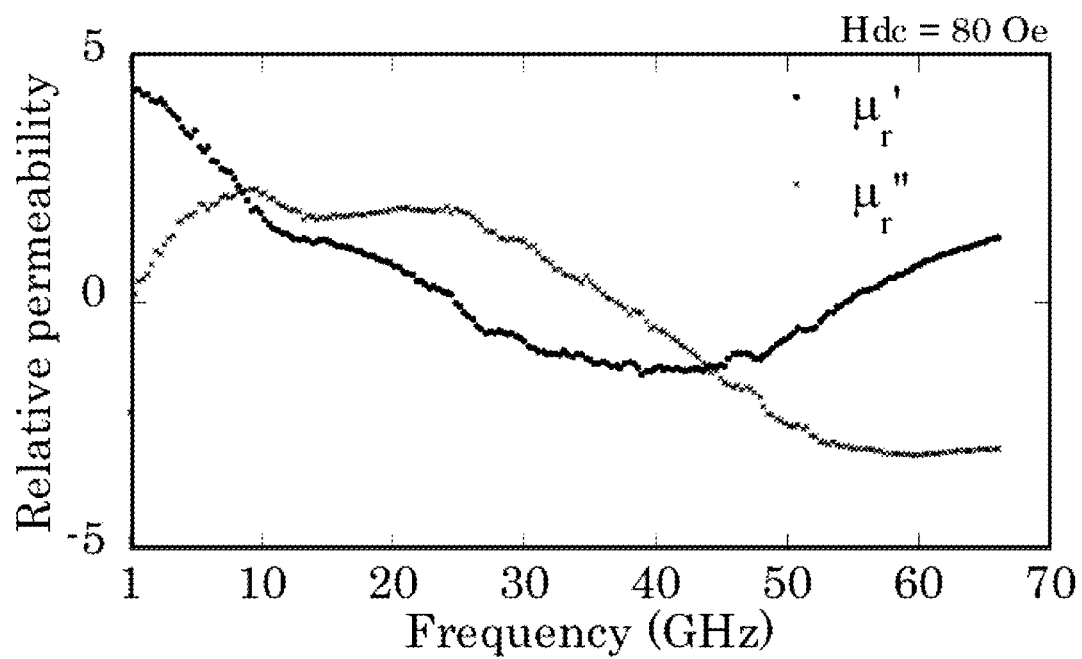

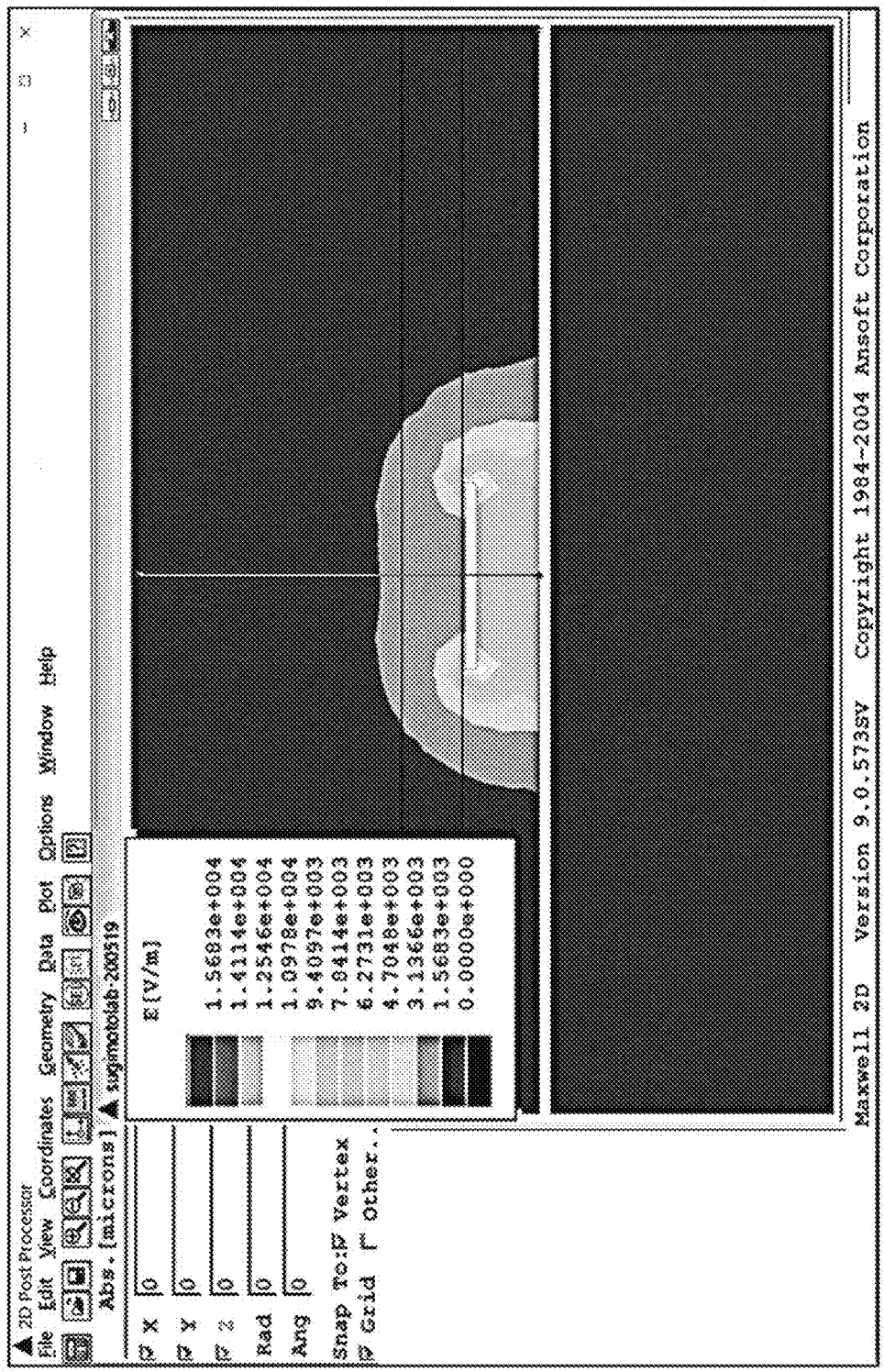
[FIG. 8(a)]

[FIG. 8(b)]
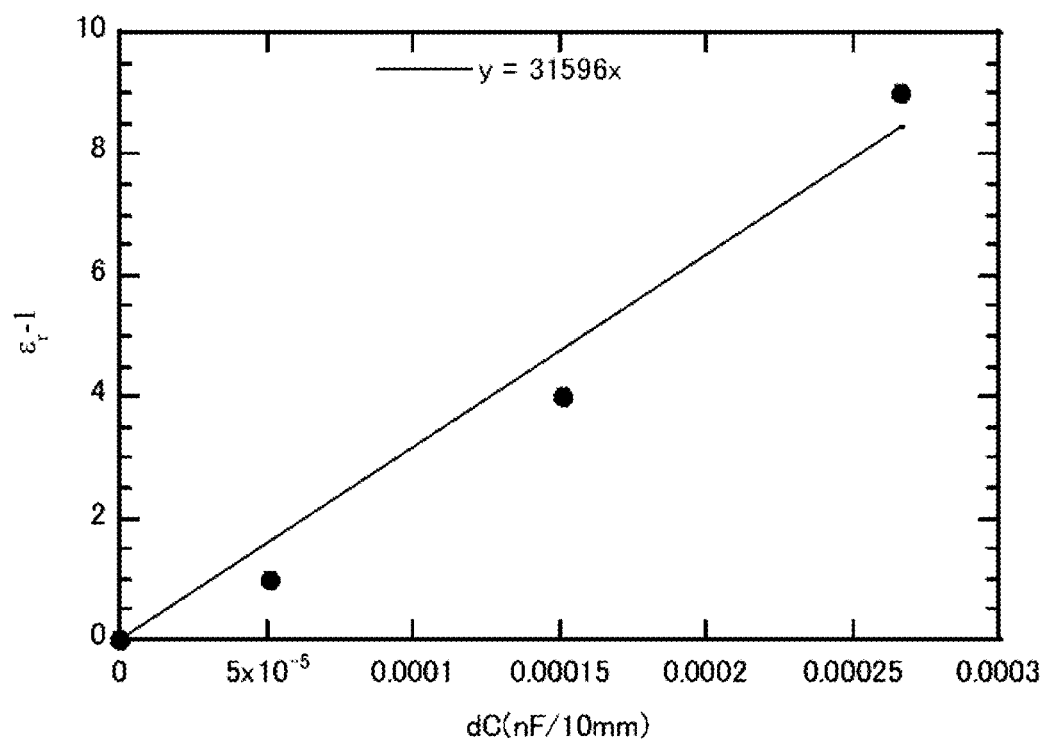

[FIG. 9]
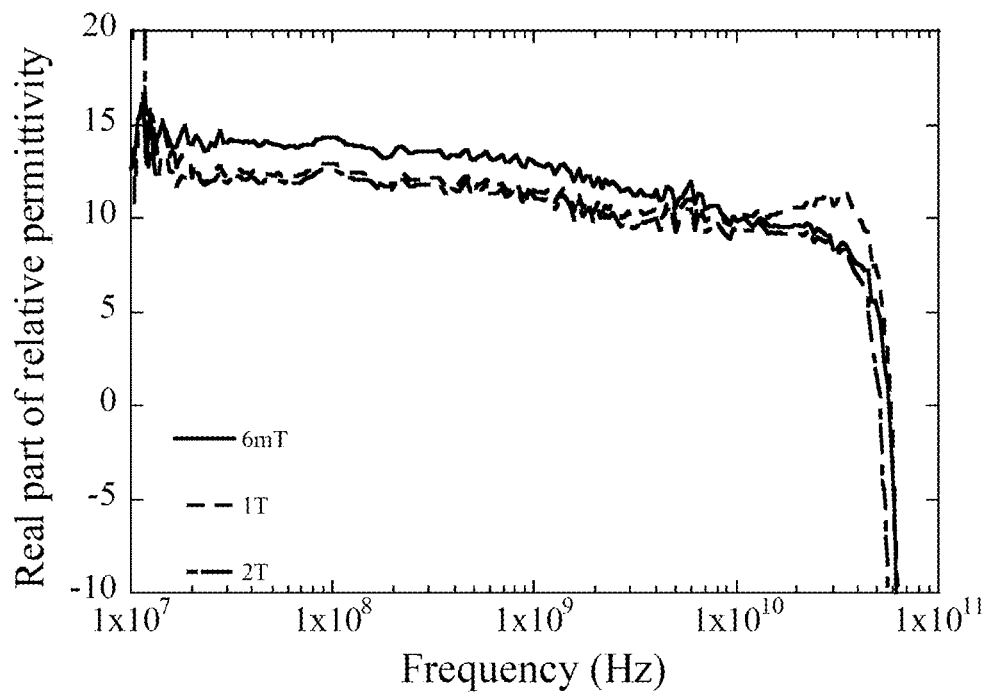
[FIG. 10]
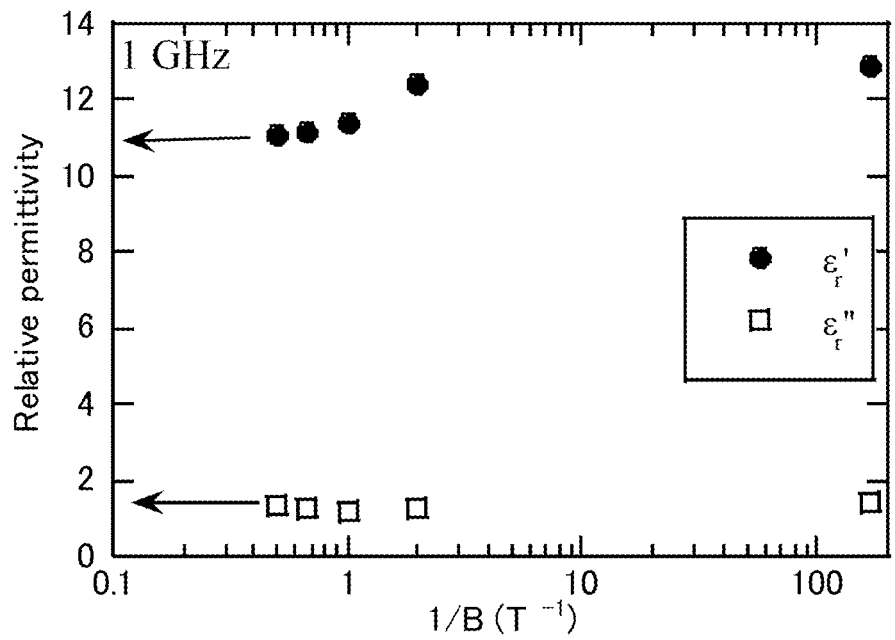

[FIG. 11]
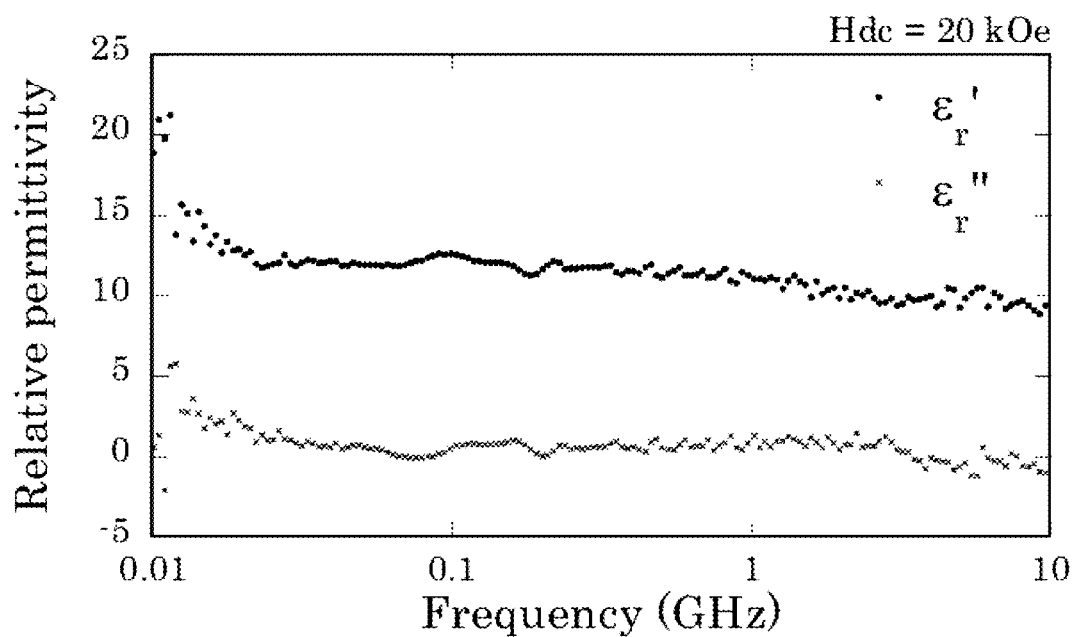

[FIG. 12]
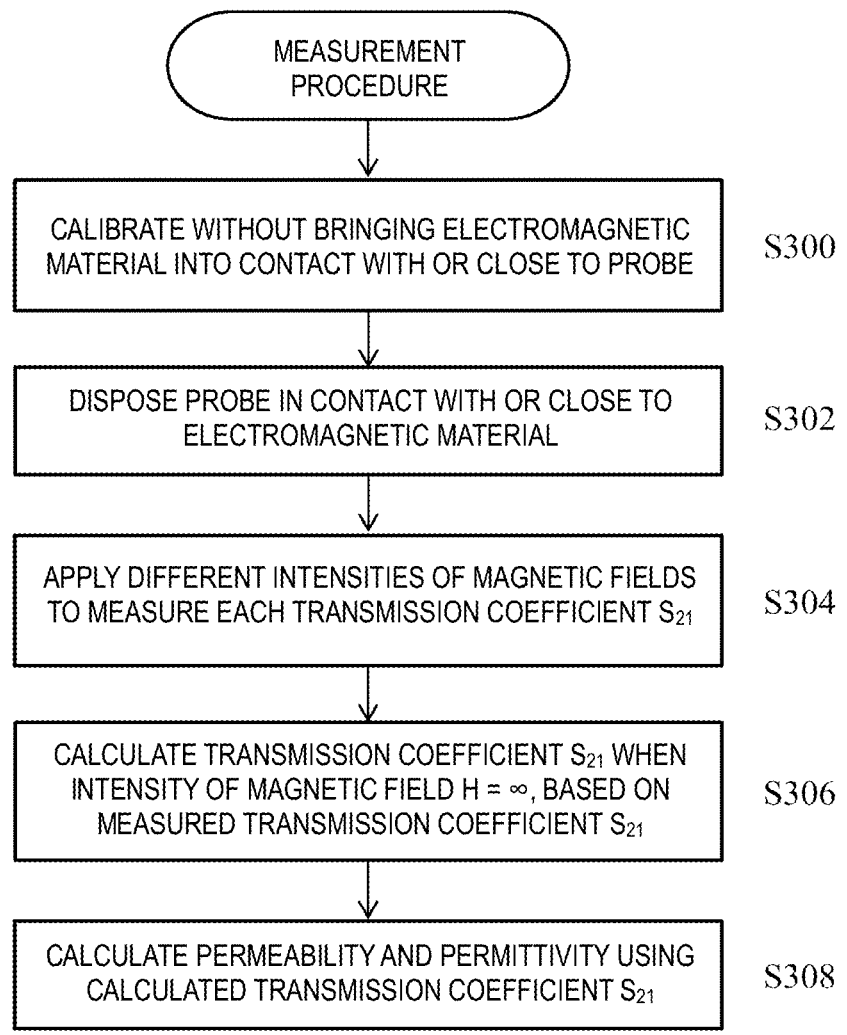

[FIG. 13(a)]
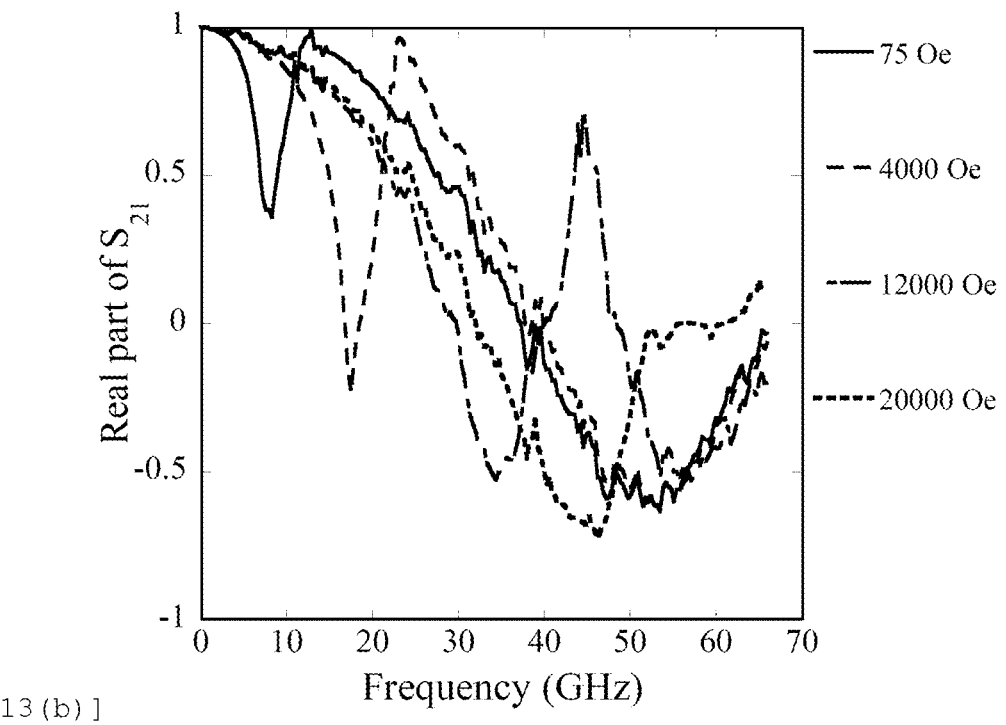
[FIG. 13(b)]
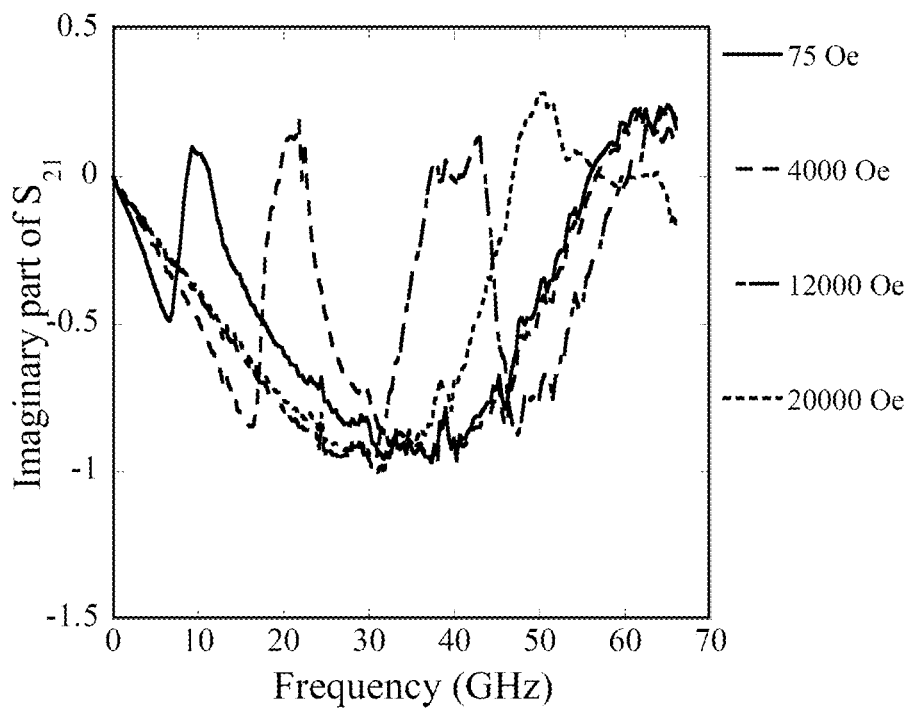

[FIG. 14(a)]
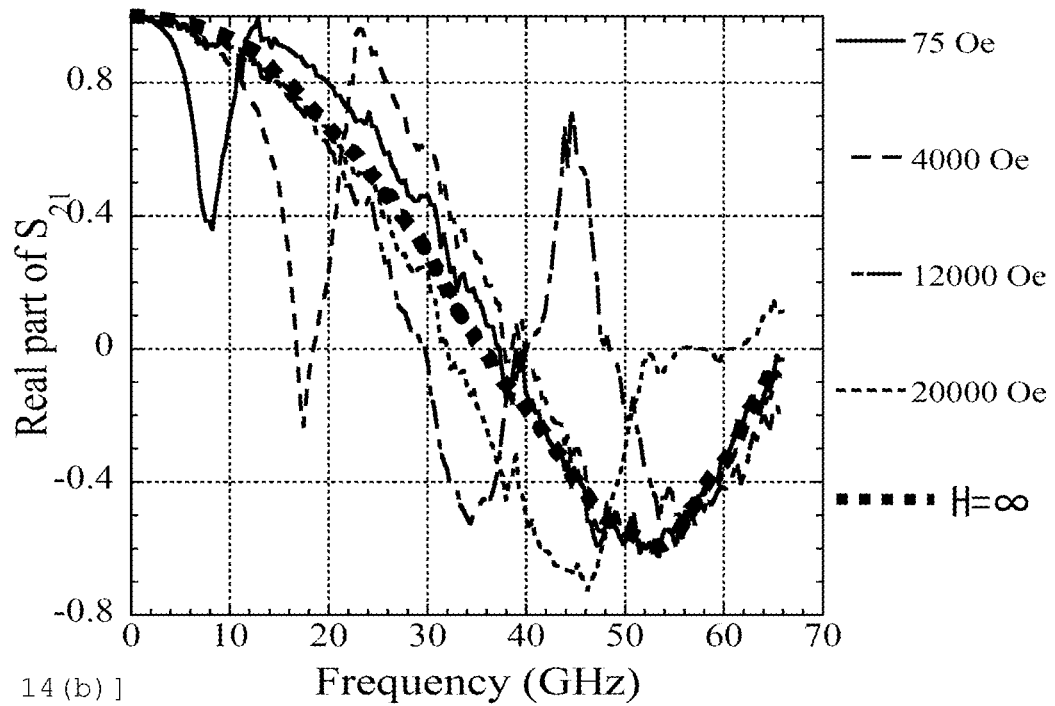
[FIG. 14(b)]
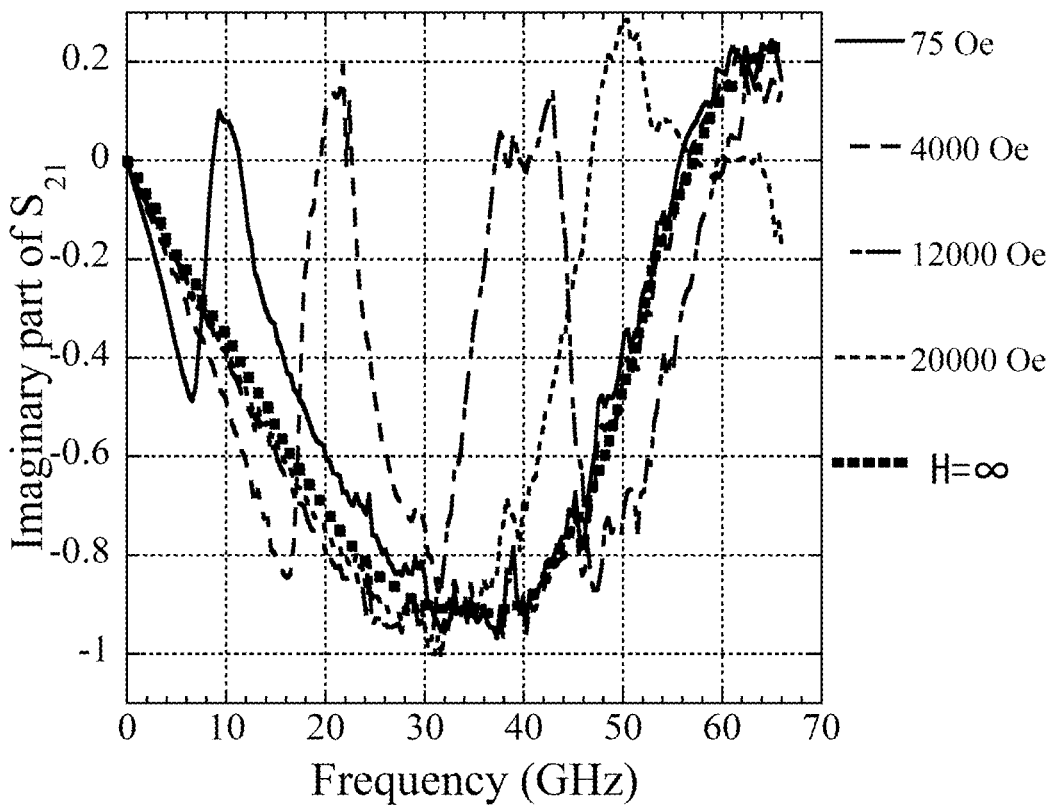

[FIG. 15]
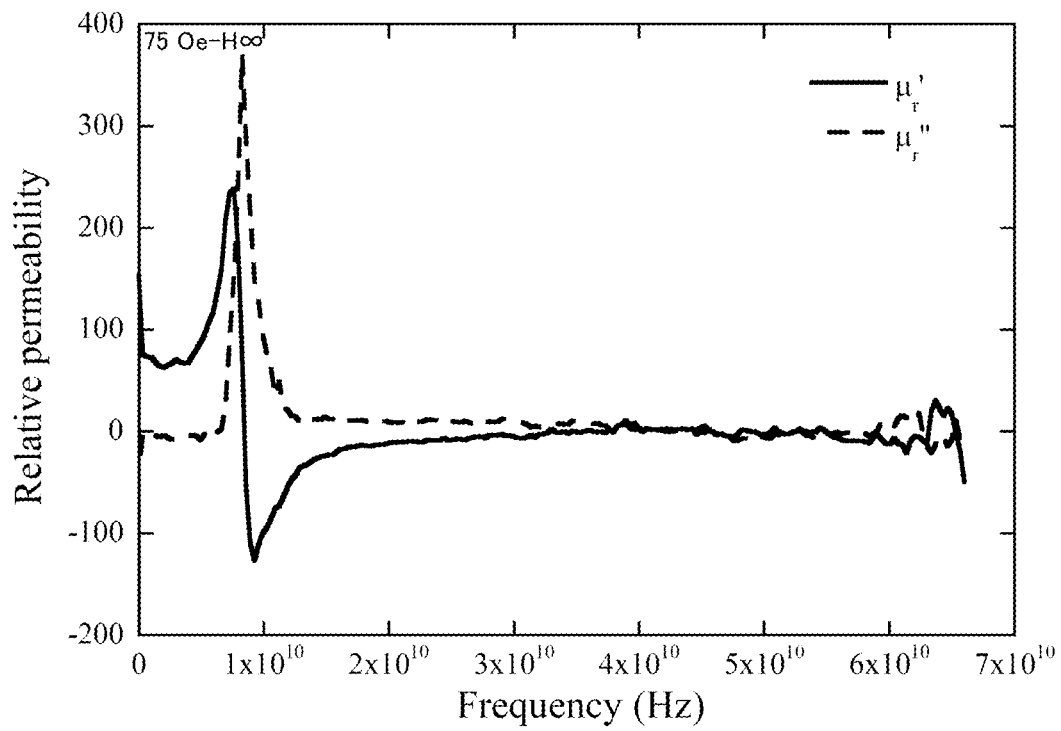
[FIG. 16]
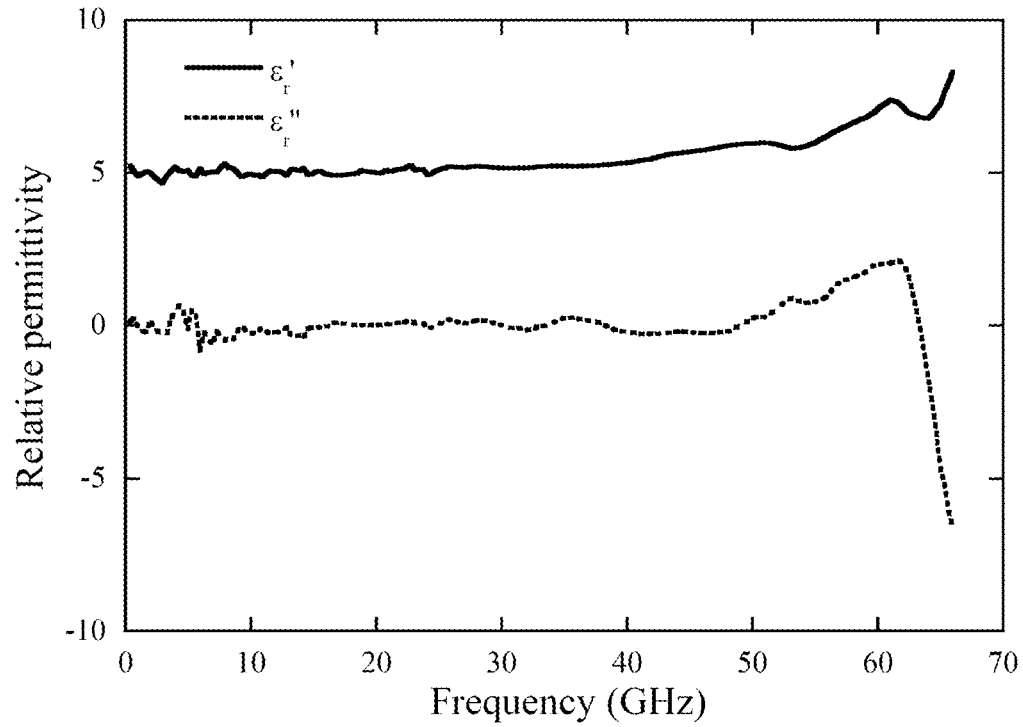

MEASUREMENT DEVICE AND MEASUREMENT METHOD FOR MEASURING PERMEABILITY AND PERMITTIVITY

CROSS-REFERENCE TO RELATED APPLICATIONS

This application is a bypass continuation application of International Application No. PCT/JP2021/036863, filed on Oct. 5, 2021, and claims priority to Japanese Patent Application No. 2020-178186, filed on Oct. 23, 2020, the disclosures of which are hereby incorporated by reference in their entireties.

BACKGROUND OF THE INVENTION

Field of the Invention

The present invention relates to a measurement device and a measurement method for measuring permeability and permittivity of an object to be measured, which is an electromagnetic material.

Description of Related Art

Many methods of measuring high-frequency permeability (usually, several hundred kHz to several GHz) of an electromagnetic material have been proposed since the 1950s, but all of the methods are methods using a coil (or an antenna) (see, for example, N-PTLs 1 to 3) or methods using a transmission line, a waveguide, or the like (see, for example, N-PTL 4).

In recent years, the present inventor has published a paper about obtaining permeability based on an impedance of a fine strip thin film having a width of about 100 μm (see, for example, N-PTL 5). PTL 1 discloses a measurement method applicable to an electromagnetic material of any size without being limited to a strip. PTL 2 discloses a method capable of evaluating permeability by disposing a meander-shaped probe close to an electromagnetic material. PTL 3 discloses a method of measuring permeability by bringing a linear portion of a linear microstrip conductor formed of one linear portion close to an electromagnetic material with an insulator sandwiched therebetween. PTL 4 discloses a method of measuring permeability by closely disposing an electromagnetic material to be measured (electromagnetic material) on a probe in which a flexible dielectric body is disposed between a microstrip conductor and a ground conductor.

CITATION LIST

Patent Literature

PTL 1: JP-A-2010-060367
PTL 2: JP-A-2012-032165
PTL 3: JP-A-2015-172497
PTL 4: JP-A-2016-053569

Non-Patent Literature

N-PTL 1: P. A. Calcagno, D. A. Thompson, "Semiautomatic permeance tester for thick magnetic films", Rev. Sci. Instrum, 1975, 46, p. 904
N-PTL 2: B. C. Webb, M. E. Re, C. V. Jahnes and M. A. Russak, "High-frequency permeability of laminated and unlaminated, narrow thin-film magnetic stripes", J. Appl. Phys., 1991, vol 69, p. 5611-5615
N-PTL 3: M. Yamaguchi, S. Yabukami and K. I. Arai, "A New 1 MHz-2 GHz Permeance Meter For Metallic Thin Films", IEEE Trans. Magn., 1997, 33, p. 3619
N-PTL 4: H. B. Weir, "Automatic Measurement of Complex Dielectric Constant and Permeability at Microwave Frequencies", Proc IEEE, 1975, 62, p. 33
N-PTL 5: S. Yabukami, T. Uo, M. Yamaguchi, K. I. Arai, and M. Takezawa, "High sensitivity permeability measurements of striped films obtained by input impedance", IEEE Transactions, Magn., 2001, vol.37, p. 2774-2778

In recent years, in development of an electromagnetic material corresponding to a high frequency of, for example, about several GHz to several tens of GHz, in addition to a high-frequency magnetic characteristic of the electromagnetic material, characteristics such as magnetic characteristics and electrical characteristics of an electromagnetic material which has characteristics of a dielectric body and which, at the same time, is an electromagnetic material have been analyzed. In particular, a technique for measuring both permeability and permittivity of an electromagnetic material such as a so-called radio wave absorber or a shield material at a high frequency is demanded.

Accordingly, an object of the invention is to provide a measurement device and a measurement method capable of measuring both permeability and permittivity of an electromagnetic material to be measured.

SUMMARY OF THE INVENTION

A configuration of a measurement device according to the invention for achieving the above object is a measurement device for measuring permeability and permittivity of an object to be measured, which is an electromagnetic material. The measurement device includes: a probe in which a signal transmission line is formed and on which the object to be measured is capable of being disposed close to or in contact with the signal transmission line; a magnetic field application unit configured to apply a magnetic field to the object to be measured; a signal measurement instrument configured to measure a signal transmitted through the signal transmission line in each state in which the object to be measured is disposed and not disposed on the signal transmission line and in each state in which the magnetic field is applied and not applied by the magnetic field application unit; a permeability processing unit configured to obtain the permeability of the object to be measured based on the signal transmitted through the signal transmission line in each state in which the magnetic field is applied and not applied by the magnetic field application unit; and a permittivity processing unit configured to obtain the permittivity of the object to be measured based on the signal transmitted through the signal transmission line in each state in which the object to be measured is disposed and not disposed on the signal transmission line.

A measurement method according to the invention is a method for measuring permeability and permittivity of an object to be measured, which is an electromagnetic material, by a measurement device. The measurement device includes: a probe in which a signal transmission line is formed and on which the object to be measured is capable of being disposed close to or in contact with the signal transmission line; a magnetic field application unit configured to apply a magnetic field to the object to be measured; a signal measurement instrument configured to measure a signal transmitted through the signal transmission line in each state in which the object to be measured is disposed and not disposed on the signal transmission line and in each state in which the magnetic field is applied and not applied by the magnetic field application unit; and an arithmetic processing device configured to acquire the signal measured by the signal measurement instrument. The method includes: a step of obtaining, by the arithmetic processing device, the permeability of the object to be measured based on the signal transmitted through the signal transmission line in each state in which the magnetic field is applied and not applied by the magnetic field application unit; and a step of obtaining, by the arithmetic processing device, the permittivity of the object to be measured based on the signal transmitted through the signal transmission line in each state in which the object to be measured is disposed and not disposed on the signal transmission line.

Each step of the measurement method described above is performed by the arithmetic processing device, which is a computer device, executing a computer program. In the invention, the computer program is provided to execute the measurement method described above.

According to the invention, it is possible to measure both permeability and permittivity of an electromagnetic material to be measured. The permeability and the permittivity of the electromagnetic material can be measured at the same time, and can be obtained with higher accuracy.

BRIEF DESCRIPTION OF THE DRAWINGS

FIG. 1 is a block diagram illustrating a schematic configuration example of a permeability measurement device according to an embodiment of the invention.

FIGS. 2(a) and 2(b) are diagrams illustrating a first configuration example of a probe 10.

FIGS. 3(a) and 3(b) are diagrams illustrating a second configuration example of the probe 10.

FIG. 4 is a flowchart illustrating a procedure of a method for measuring permeability according to the embodiment of the invention.

FIG. 5 is a flowchart illustrating a procedure of the method for measuring permittivity according to the embodiment of the invention.

FIGS. 6(a) and 6(b) are diagrams illustrating an example of data obtained by electromagnetic field analysis processing for measuring the permeability.

FIG. 7 is a graph illustrating permeability $\mu_r$ obtained by the measurement.

FIGS. 8(a) and 8(b) are diagrams illustrating an example of data obtained by the electromagnetic field analysis processing for measuring the permittivity.

FIG. 9 is an example of data of measured permittivity $\varepsilon_r$ (real part).

FIG. 10 is a diagram illustrating extrapolation processing on the permittivity $\varepsilon_r$.

FIG. 11 is a graph illustrating the permittivity $\varepsilon_r$ obtained by step S206.

FIG. 12 is a flowchart illustrating another procedure of the method for measuring permeability and permittivity according to the embodiment of the invention.

FIGS. 13(a) and 13(b) are diagrams illustrating an example of a measurement result of a transmission coefficient ($S_{21}$) when magnetic fields having different intensities are applied.

FIGS. 14(a) and 14(b) are diagrams illustrating an example of a measurement result of a transmission coefficient ($S_{21}(H=\infty)$) when an intensity of a magnetic field is infinite ($H=\infty$).

FIG. 15 is a graph illustrating an example of a measurement result of the permeability $\mu$ obtained by processing in step S308.

FIG. 16 is a graph illustrating an example of a measurement result of the permittivity $\varepsilon$ obtained by the processing in step S308.

DESCRIPTION OF THE INVENTION

Hereinafter, an embodiment of the invention will be described with reference to the drawings. However, such an embodiment does not limit the technical scope of the invention.

FIG. 1 is a diagram illustrating a configuration example of a permeability measurement device according to an embodiment of the invention. The permeability measurement device according to the embodiment of the invention includes a probe 10, a network analyzer 20 (signal measurement instrument), and an arithmetic processing device (for example, a computer device such as a personal computer) 30 that executes numerical analysis processing.

The probe 10 is disposed so as to be in contact with or close to an electromagnetic material 1 as a sample (object to be measured), and is connected to the network analyzer (for example, N5227A manufactured by Agilent Technologies, Ltd.) 20 via a signal cable (for example, coaxial cable) 3. A current signal is supplied by the network analyzer 20, which is a current supply source, to measure a transmission coefficient ($S_{21}$) of the electromagnetic material 1 as the object to be measured, signal data thereof is taken into the arithmetic processing device (computer device) 30, and permeability (complex permeability) and permittivity (complex permittivity) of the electromagnetic material 1 as the object to be measured are obtained by predetermined numerical analysis processing. In order to apply a magnetic field to the electromagnetic material 1, a magnet (magnetic field application unit) 40 formed of a Helmholtz coil (electromagnetic coil) whose energization is controlled is used.

The arithmetic processing device 30 functions as a permeability processing unit for obtaining high-frequency permeability of the electromagnetic material 1 and a permittivity processing unit for obtaining high-frequency permittivity of the electromagnetic material 1, and executes an arithmetic processing program for calculating the permeability and the permittivity. The arithmetic processing program is a computer program that executes processing of calculating the permeability and the permittivity, which will be described later. Table data used in the execution of the arithmetic processing program is stored in a storage unit of the arithmetic processing device 30. This table data is three-dimensional numerical data of electromagnetic field analysis, specifically, data indicating a relation between inductance L and permeability $\mu_r$ and a relation between a capacitance C and permittivity $\varepsilon_r$ of the electromagnetic material 1 to be evaluated by simulation calculation using a known electromagnetic field analysis program, and is prepared in advance.

FIGS. 2(a) and 2(b) are diagrams illustrating a first configuration example of the probe 10. FIG. 2(a) illustrates a form of the probe 10 in the first configuration example, and FIG. 2(b) illustrates a state in which a sample is disposed on the probe 10 in the first configuration example. As illustrated in FIG. 2(a), the probe 10 includes a microstrip conductor 11, a flexible substrate 12 (for example, a polyimide substrate RBF-5 manufactured by Shin-Etsu Chemical Co., Ltd., relative permittivity=3.5, and thickness=0.025 mm), a fluororesin substrate 13 (for example, CGK-500 manufactured by Chukoh Chemical Industries, Ltd., relative permittivity=5, and thickness=0.5 mm), a ground conductor 14, and a pair of connectors 15 connected to both ends of the microstrip conductor 11. Here, the microstrip conductor 11 is processed into a linear microstrip line by etching. The microstrip conductor 11 and the flexible substrate 12 are integrally fixed to each other by a chemical treatment or a thermal treatment. The ground conductor 14 is formed by, for example, a copper foil. A configuration in which the flexible substrate 12 and the fluororesin substrate 13, which are dielectric bodies, are sandwiched between the microstrip conductor 11 and the ground conductor 14 forms a microstrip line.

As illustrated in FIG. 2(b), the electromagnetic material 1 to be measured is prepared by being attached to a planar substrate 17, and is disposed by applying a pressure (not illustrated) from above so as to be close to or in contact with the microstrip conductor 11. The microstrip conductor 11 can be flexibly deformed, and thus the microstrip conductor 11 and the electromagnetic material 1 can be disposed in close contact with each other in response to warpage of the substrate 17.

FIGS. 3(a) and 3(b) are diagrams illustrating a second configuration example of the probe 10. FIG. 3(a) illustrates a form of the probe 10 in the second configuration example, and FIG. 3(b) illustrates a state in which the sample is disposed on the probe 10 in the second configuration example. As illustrated in FIG. 3(a), the probe 10 includes the microstrip conductor 11 (width=0.4 mm), the flexible substrate (sheet) 12 (for example, ROGERSduroid 5880, relative permittivity=2.2, and thickness=0.127 mm), the ground conductor 14, and the pair of connectors 15 connected to both ends of the microstrip conductor 11. The connectors 15 are connected to the signal cable 3 (FIG. 1). The microstrip conductor 11 and the flexible substrate 12 are integrally fixed to each other by a chemical treatment or a thermal treatment. In the second configuration example, the fluororesin substrate 13 in the first configuration example of FIG. 2(a) is omitted, and the flexible substrate 12 is pressed against the ground conductor 14 having a planar structure and a curved structure. Although inside of the ground conductor 14 is illustrated to be transparent for the sake of explanation, the ground conductor 14 is actually made of a metal material such as copper. The microstrip conductor 11 is processed by etching. The microstrip conductor 11 includes a linear portion 11a at the center and a curved portion 11b on both sides of the linear portion 11a. End portions of the microstrip conductor 11 are electrically connected to the connectors 15. In the microstrip conductor 11, both the linear portion 11a and the curved portion 11b are matched in a characteristic impedance of 50Ω. Similar to the configuration in FIGS. 2(a) and 2(b), a configuration in which the flexible substrate 12, which is a dielectric body, is sandwiched between the microstrip conductor 11 and the ground conductor 14 forms a microstrip line.

As illustrated in FIG. 3(b), the electromagnetic material 1 to be measured is prepared by being attached to the planar substrate 17, and is disposed by applying a pressure (not illustrated) from above so as to be close to or in contact with the microstrip conductor 11.

The microstrip conductor 11 extends into the ground conductor 14 through an opening 14a provided in the ground conductor 14 and is connected to the connector 15 on an opposite surface side. For example, when the electromagnetic material 1 having a large diameter and the substrate 17 are disposed close to each other, measurement can be performed without colliding with the connector 15 or the signal cable 3 (FIG. 1) connected thereto.

The measurement is performed by directly bringing the microstrip conductor 11 and the electromagnetic material 1 into close contact with each other or coating an insulator such as a resist in a thickness of several microns therebetween. Alternatively, the measurement is performed by providing a gap formation jig around the probe 10 such that a gap is set to a predetermined amount and disposing the microstrip conductor 11 close to the electromagnetic material 1. In a case in which the electromagnetic material 1 is an insulating thin film, an SN ratio in measurement is improved when the microstrip conductor 11 and the electromagnetic material 1 are brought into direct contact with each other.

A procedure for measuring the permeability and the permittivity of an electromagnetic material to be evaluated by the measurement device including the probe 10 as described above will be described below.

FIGS. 4 and 5 are flowcharts illustrating procedures of a method for measuring permeability and permittivity according to the embodiment of the invention. FIG. 4 is the flowchart illustrating the procedure for measuring the permeability, and FIG. 5 is the flowchart illustrating the procedure for measuring the permittivity. The procedures in FIGS. 4 and 5 can be continuously performed in the same measurement system, and the permeability and the permittivity of the electromagnetic material to be evaluated can be continuously measured by measurement operations at the same timing. First, the procedure for measuring the permeability of the electromagnetic material as the object to be measured is illustrated in FIG. 4.

In FIG. 4, the microstrip conductor 11 of the probe 10 is brought into contact with the electromagnetic material 1 to be evaluated (S100). Then, the electromagnetic material 1 is placed in the Helmholtz coil (magnetic field application unit) 40, and a strong DC magnetic field (for example, about 20 kOe) is applied to magnetically saturate the electromagnetic material 1, thereby calibrating the network analyzer 20 (S102). By doing so, electrical lengths of the probe 10 and the coaxial cable 3, and a Low frequency impedance of the electromagnetic material, a non-magnetic signal, and the like are removed. By this calibration, it is possible to perform measurement with reference to a state in which a predetermined magnetic field is applied to the object to be measured.

Thereafter, the DC magnetic field is released, and a transmission coefficient ($S_{21}$) of contribution of the electromagnetic material 1 is measured (S104). After the calibration by the application of the magnetic field sufficient for magnetic saturation, the application of the magnetic field is stopped and the transmission coefficient ($S_{21}$) is measured, whereby the transmission coefficient ($S_{21}$) of only the contribution of the electromagnetic material 1 can be measured.

The permeability is obtained by the following arithmetic processing based on the measured transmission coefficient ($S_{21}$) (S106). The arithmetic processing of obtaining the permeability is, for example, as follows.

(a1) For the electromagnetic material to be evaluated, known electromagnetic field analysis processing (for example, finite element method analysis) is executed using the computer device 30. A relation between the permeability and inductance for the electromagnetic material is acquired as table data.

FIGS. 6(a) and 6(b) are diagrams illustrating an example of data obtained by the electromagnetic field analysis processing. FIG. 6(a) illustrates an example of a screen of the computer device 30 representing a magnetic field analysis diagram of the electromagnetic material, and FIG. 6(b) is an example of the table data indicating a relation between the permeability μ (relative permeability $μ_r$) and the inductance L. By the finite element method analysis processing, the inductance L when the permeability $μ_r$ is changed can be obtained by calculation using a Maxwell equation. The table data indicating the relation between the permeability and the inductance is stored in the storage unit of the computer device 30 in advance. In addition, an example of the illustrated measurement result is data obtained by the measurement operation of the inventors, and the electromagnetic material to be measured is a powder resin composite sheet.

(a2) The transmission coefficient ($S_{21}$) measured in step S104 is converted to an impedance Z according to the following Equation (1).

[Math. 1]

$$Z = 2Z_0 \cdot \frac{1-S_{21}}{S_{21}} \quad (1)$$

Here, characteristic impedance $Z_0=50Ω$.

(a3) The obtained impedance Z is converted into the inductance L according to the following Equation (2).

[Math. 2]

$$L=-jZ/ω \quad (2)$$

(a4) The permeability μ corresponding to the calculated inductance L is obtained from the table data indicating the relation between the permeability and the inductance, which is obtained by the electromagnetic field analysis.

FIG. 7 is a graph illustrating the permeability μ obtained by processing in step S106. The permeability (complex permeability) μ of the electromagnetic material 1 is expressed by the following Equation (3), where p' is a real part of the permeability, and μ" is an imaginary part of the permeability.

[Math. 3]

$$μ=μ'-jμ'' \quad (3)$$

Next, the procedure for measuring the permittivity of the electromagnetic material to be evaluated is illustrated in FIG. 5.

First, the network analyzer 20 is calibrated (S200). At this time, the electromagnetic material 1 as the object to be measured is not brought into contact with or close to the probe 10, and the calibration is performed in a state in which no object to be measured 1 is present. The magnetic field is also not applied. By this calibration, it is possible to perform measurement with reference to a state in which the object to be measured is not disposed in contact with or close to the probe.

After the calibration, the electromagnetic material 1 as the object to be measured is brought into contact with or close to the microstrip conductor 11 of the probe 10 (S202). Then, the magnetic field is applied by the magnetic field application unit 40 implemented as the Helmholtz coil, and the transmission coefficient ($S_{21}$) is measured by the network analyzer 20 in a state in which the magnetic field is applied (S204). At this time, the magnetic field is changed and applied by the magnetic field application unit 40, and the transmission coefficient ($S_{21}$) is measured in each state in which magnetic fields having different intensities are applied. The applied magnetic field is set to be different in a plurality of stages (for example, ten or more stages), also including a case in which the magnetic field is not applied (H=0).

The permittivity ε of the electromagnetic material 1 is calculated by the computer device 30 based on a plurality of transmission coefficients ($S_{21}$) corresponding to the magnetic fields having different intensities measured in step S204 (S206). Specific processing of calculating the permittivity is, for example, as follows.

(b1) For the electromagnetic material to be evaluated, known electromagnetic field analysis processing (for example, finite element method analysis) is executed using the computer device 30. A relation between the permittivity ε and the capacitance C for the electromagnetic material is acquired as table data.

FIGS. 8(a) and 8(b) are diagrams illustrating an example of data obtained by the electromagnetic field analysis processing. FIG. 8(a) illustrates an example of the screen of the computer device 30 representing the magnetic field analysis diagram of the electromagnetic material, and FIG. 8(b) is an example of the table data indicating the relation between the permittivity ε (relative permittivity $ε_r$) and the capacitance C. By the finite element method analysis processing, the capacitance C when the permittivity ε is changed can be obtained by calculation using the Maxwell equation. The table data indicating the relation between the permittivity ε and the capacitance C is stored in the storage unit of the computer device 30 in advance. In addition, an example of the illustrated measurement result is data obtained by the measurement operation of the inventors, and the electromagnetic material to be measured is a powder resin composite sheet as in the example in FIGS. 6(a) and 6(b).

(b2) The transmission coefficient ($S_{21}$) measured in step S204 is converted to an admittance Y according to the following Equation (4).

[Math. 4]

$$Y = \frac{2}{Z_0} \cdot \frac{1-S_{21}}{S_{21}} \quad (4)$$

Here, characteristic impedance $Z_0=50Ω$.

(b3) The obtained admittance Y is converted into the capacitance C according to the following Equation (5).

[Math. 5]

$$C=-jY/Ω \quad (5)$$

(b4) The permittivity ε corresponding to the obtained capacitance C is obtained according to the table data.

FIG. 9 illustrates an example of a measurement result of the obtained permittivity $ε_r$ (real part). The measurement result illustrated in FIG. 9 exemplifies values of the permittivity $ε_r$ when the intensity of the magnetic field (magnetic flux density) is 6 mT, 1 T, and 2 T. In actual measurement by the inventors, the permittivity ε in measurement in which the magnetic field is varied for each narrower interval (0.5 T) is calculated, and a result is obtained in which the permittivity ε varies depending on the applied magnetic field. The intensity of the magnetic field (magnetic flux density) of 6 mT is obtained by detecting a slight leakage magnetic field around the magnetic field, and corresponds to measurement in a state in which the magnetic field is not applied by the magnetic field application unit 40 and there is substantially no magnetic field.

In electromagnetism, since a magnetic field and an electric field are orthogonal to each other, it is considered that the permittivity ε representing a response characteristic to the electric field does not change according to a change in the magnetic field, but it is found that, in a case in which the electromagnetic material has both characteristics of a magnetic body and a dielectric body, the permittivity ε changes depending on the change in the magnetic field in an actual measurement system. A reason thereof is considered to be that a signal component (magnetic signal) due to the application of the magnetic field is included in the measured transmission coefficient ($S_{21}$), and the following processing of obtaining more accurate permittivity ε from which an influence of the magnetic signal component is removed is executed.

(b5) For the permittivity ε obtained for each of the different magnetic fields, in order to calculate accurate permittivity ε from which an influence of the magnetic field is removed, the permittivity ε in a case in which the intensity of the magnetic field is set to infinite (H=∞) is obtained by extrapolation processing.

FIG. 10 is a diagram illustrating the extrapolation processing on the permittivity $ε_r$. In FIG. 10, a horizontal axis of the graph represents a reciprocal of the intensity of the magnetic field (magnetic flux density B), and a vertical axis represents the permittivity $ε_r$. Therefore, the permittivity $ε_r$ (H=∞) at a left end of the graph is obtained by the arithmetic processing using linear extrapolation or curve approximation, thereby obtaining more accurate permittivity ε from which a magnetic field component is removed.

FIG. 11 is a graph illustrating the permittivity $ε_r$ obtained by step S206. The permittivity (complex permittivity) $ε_r$ of the electromagnetic material 1 is expressed by the following Equation (6), where $ε_r'$ is a real part of the permittivity, and $ε_r''$ is an imaginary part of the permittivity.

[Math. 6]

$$ε=ε'-jε'' \quad (6)$$

The procedures in FIGS. 4 and 5 are measurement processing that can be continuously performed, and the permeability and the permittivity of the object to be measured can be measured in the same measurement system at the same time.

FIG. 12 is a flowchart illustrating another procedure of the method for measuring permeability and permittivity according to the embodiment of the invention.

First, the network analyzer 20 is calibrated (S300). At this time, the electromagnetic material 1 as the object to be measured is not brought into close contact with or close to the probe 10, and the calibration is performed in a state in which no object to be measured 1 is present. The magnetic field is also not applied.

After the calibration, the electromagnetic material 1 as the object to be measured is brought into contact with or close to the microstrip conductor 11 of the probe 10 (S302). Then, the magnetic field is applied by the magnetic field application unit 40 implemented as the Helmholtz coil, and the transmission coefficient ($S_{21}$) is measured by the network analyzer 20 in a state in which the magnetic field is applied (S304). At this time, the magnetic field is changed and applied by the magnetic field application unit 40, and the transmission coefficient ($S_{21}$) is measured in each state in which the magnetic fields having different intensities are applied. The applied magnetic field is set to be different in a plurality of stages (for example, ten or more stages), also including a case in which the magnetic field is not applied (H=0).

FIGS. 13(*a*) and 13(*b*) are diagrams illustrating an example of a measurement result of the transmission coefficient ($S_{21}$) when the magnetic fields having different intensities are applied. FIG. 13(*a*) illustrates an example of the measurement result of a real part of the transmission coefficient ($S_{21}$), and FIG. 13(*b*) illustrates an example of the measurement result of an imaginary part of the transmission coefficient ($S_{21}$). The measurement result in FIGS. 13(*a*) and 13(*b*) exemplifies actual measurement values of the transmission coefficient ($S_{21}$) when the intensity of the magnetic field is 75 Oe, 4000 Oe, 12000 Oe, and 20000 Oe. In actual measurement by the inventors, measurement is performed by varying the magnetic field for each narrower interval (2000 Oe). The intensity of the magnetic field of 75 Oe is obtained by detecting a slight leakage magnetic field around the magnetic field, and corresponds to the measurement in a state where the magnetic field is not applied by the magnetic field application unit 40 and there is substantially no magnetic field.

The transmission coefficient ($S_{21}$ (H=∞)) when the intensity of the magnetic field is infinite (H=∞) is calculated by the computer device 30 using a plurality of transmission coefficients ($S_{21}$) corresponding to the magnetic fields having different intensities, which are measured in step S304 (S306). The transmission coefficient ($S_{21}$ (H=∞)) when the intensity of the magnetic field is infinite (H=∞) can be obtained by executing the extrapolation processing on measurement values of the plurality of transmission coefficients ($S_{21}$) in which the intensity of the magnetic field is a finite value. The extrapolation processing is the same as the processing in (b5) described above. The transmission coefficient ($S_{21}$(H=∞)) when the intensity of the magnetic field is infinite (H=∞) is obtained by extending the transmission coefficient ($S_{21}$) measured at the intensity of a finite magnetic field by the magnetic field application unit by extrapolation arithmetic processing using linear extrapolation or curve approximation, for example.

FIGS. 14(*a*) and 14(*b*) are diagrams illustrating an example of a measurement result of the transmission coefficient ($S_{21}$(H=∞)) when the intensity of the magnetic field is infinite (H=∞). FIG. 14(*a*) illustrates an example of the measurement result of the real part of the transmission coefficient ($S_{21}$(H=∞)), and FIG. 14(*b*) illustrates an example of the measurement result of the imaginary part of the transmission coefficient ($S_{21}$ (H=∞)). The transmission coefficient ($S_{21}$ (H=∞)) is indicated by a thick dotted line superimposed on the graph in FIGS. 13(*a*) and 13(*b*).

By obtaining the transmission coefficient ($S_{21}$ (H=∞)) when the intensity of the magnetic field is infinite, an influence of a magnetic component is completely removed from the permittivity E, and more accurate permittivity ε can be calculated. Further, the permeability μ can be calculated with higher accuracy than the permeability obtained based on the transmission coefficient ($S_{21}$) obtained by performing the calibration by applying a magnetic field having a finite intensity (for example, the processing in FIG. 4).

The permeability μ and the permittivity ε of the electromagnetic material are calculated using the transmission coefficient ($S_{21}$ (H=∞)) obtained by step S306 (S308). The permeability μ can be calculated by executing the arithmetic processing of the processing (a1) to (a4) described above using Equations (1), (2), and (3) described above. The permittivity ε can be calculated by executing the arithmetic processing of the processing (b1) to (b4) described above using Equations (4), (5), and (6) described above.

FIG. 15 is a graph illustrating an example of a measurement result of the permeability μ obtained by processing in step S308, where μ' is a real part of the permeability, and μ" is an imaginary part of the permeability. FIG. 16 is a graph illustrating an example of a measurement result of the permittivity $\varepsilon_r$ obtained by the processing in step S308, where $\varepsilon_r'$ is a real part of the permittivity, and $\varepsilon_r''$ is an imaginary part of the permittivity.

A signal transmission line included in the probe 10 is not limited to a microstrip line illustrated in the configuration example described above, and may be configured using, for example, a coplanar line or a coaxial line.

The invention is not limited to the above embodiment, and it is needless to say that design changes that do not depart from the scope of the invention including various modifications and corrections that can be conceived by a person skilled in the art are included in the invention.

REFERENCE SIGN LIST 1 electromagnetic material (object to be measured)
3 coaxial cable
10 probe
11 microstrip conductor
12 flexible substrate
13 fluororesin substrate
14 ground conductor
14a opening
15 connector
17 substrate
20 network analyzer (signal measurement instrument)
30 arithmetic processing device
40 magnetic field application unit

The invention claimed is:

1. A measurement device for measuring permeability and permittivity of an object to be measured, which is an electromagnetic material, the measurement device comprising:
    a probe in which a signal transmission line having a strip conductor is formed and on which the object to be measured is capable of being disposed close to or in contact with the strip conductor along its length;
    a DC magnetic field application unit configured to apply a DC magnetic field to the object to be measured;
    a signal measurement instrument configured to measure a transmission coefficient of a signal transmitted through the signal transmission line in each state in which the object to be measured is disposed and not disposed on the signal transmission line and in each state in which the magnetic field is applied and not applied by the magnetic field application unit;
    a permeability processing unit configured to obtain the permeability of the object to be measured based on the transmission coefficient of the signal transmitted through the signal transmission line in each state in which the DC magnetic field is applied and not applied by the DC magnetic field application unit; and
    a permittivity processing unit configured to obtain the permittivity of the object to be measured based on the transmission coefficient of the signal transmitted through the signal transmission line in each state in which the object to be measured is disposed and not disposed on the signal transmission line,
    wherein the permittivity processing unit is configured to obtain the signal when the applied DC magnetic field is infinite, based on the signal measured in each case in which DC magnetic fields having different intensities are applied by the DC magnetic field application unit, and to obtain the permittivity of the object to be measured based on the signal when the applied DC magnetic field is infinite, with reference to a state in which the object to be measured is not disposed on the signal transmission line.

2. The measurement device according to claim 1, wherein the permeability processing unit is configured to obtain the permeability based on the signal in a state in which the DC magnetic field is not applied by the DC magnetic field application unit, with reference to a state in which a predetermined DC magnetic field is applied by the DC magnetic field application unit.

3. The measurement device according to claim 1, wherein the permittivity processing unit is configured to obtain the permittivity when the applied DC magnetic field is infinite, by executing extrapolation processing on the permittivities for each case in which the DC magnetic fields having different intensities are applied.

4. The measurement device according to claim 1, wherein the permeability processing unit is configured to obtain the signal when the applied DC magnetic field is infinite based on the signal in each case in which magnetic fields having different intensities are applied by the DC magnetic field application unit and to obtain the permeability of the object to be measured based on the signal when the applied DC magnetic field is infinite, with reference to a state in which the object to be measured is not disposed on the signal transmission line.

5. The measurement device according to claim 1, wherein the signal transmission line is a microstrip line.

6. A method for measuring permeability and permittivity of an object to be measured, which is an electromagnetic material, by a measurement device including a probe in which a signal transmission line having a strip conductor is formed and on which the object to be measured is capable of being disposed close to or in contact with the strip conductor along its length, a DC magnetic field application unit configured to apply a magnetic field to the object to be measured, a signal measurement instrument configured to measure a transmission coefficient of a signal transmitted through the signal transmission line in each state in which the object to be measured is disposed and not disposed on the signal transmission line and in each state in which the magnetic field is applied and not applied by the magnetic field application unit, and an arithmetic processing device configured to acquire the signal measured by the signal measurement instrument, the method comprising:
    a step of obtaining, by the arithmetic processing device, the permeability of the object to be measured based on the transmission coefficient of the signal transmitted through the signal transmission line in each state in which the DC magnetic field is applied and not applied by the DC magnetic field application unit; and
    a step of obtaining, by the arithmetic processing device, the permittivity of the object to be measured based on the transmission coefficient of the signal transmitted through the signal transmission line in each state in which the object to be measured is disposed and not disposed on the signal transmission line,
    wherein, in the step of obtaining the permittivity, the signal when the applied DC magnetic field is infinite is obtained based on the signal measured in each case in which DC magnetic fields having different intensities are applied by the DC magnetic field application unit, and the permittivity of the object to be measured is obtained based on the signal when the applied DC magnetic field is infinite, with reference to a state in which the object to be measured is not disposed on the signal transmission line.

7. A computer program for executing a method for measuring permeability and permittivity of an object to be measured, which is an electromagnetic material, by a measurement device including a probe in which a signal transmission line having a strip conductor is formed and on which the object to be measured is capable of being disposed close to or in contact with the strip conductor along its length, a DC magnetic field application unit configured to apply a DC magnetic field to the object to be measured, a signal measurement instrument configured to measure a transmission coefficient of a signal transmitted through the signal transmission line in each state in which the object to be measured is disposed and not disposed on the signal transmission line and in each state in which the DC magnetic field is applied and not applied by the DC magnetic field application unit, and an arithmetic processing device configured to acquire the signal measured by the signal measurement instrument, the computer program causing the arithmetic processing device to execute:

a step of obtaining the permeability of the object to be measured based on the transmission coefficient of the signal transmitted through the signal transmission line in each state in which the DC magnetic field is applied and not applied by the DC magnetic field application unit; and a step of obtaining the permittivity of the object to be measured based on the transmission coefficient of the signal transmitted through the signal transmission line in each state in which the object to be measured is disposed and not disposed on the signal transmission line, wherein, in the step of obtaining the permittivity, the signal when the applied DC magnetic field is infinite is obtained based on the signal measured in each case in which DC magnetic fields having different intensities are applied by the DC magnetic field application unit, and the permittivity of the object to be measured is obtained based on the signal when the applied DC magnetic field is infinite, with reference to a state in which the object to be measured is not disposed on the signal transmission line.

* * * * *